United States Patent
Enqvist et al.

(10) Patent No.: US 10,239,904 B2
(45) Date of Patent: Mar. 26, 2019

(54) METHOD FOR PRODUCING SOLID LIGNIN

(71) Applicant: Valmet Technologies Oy, Espoo (FI)

(72) Inventors: Eric Enqvist, Helsinki (FI); Ville Tarvo, Espoo (FI); Panu Tikka, Espoo (FI); Tobias Wittmann, Berlin (DE); Henrik Wallmo, Alingsås (SE); Anders Littorin, Hisings Kärra (SE)

(73) Assignee: VALMET TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/292,079

(22) Filed: Oct. 12, 2016

(65) Prior Publication Data
US 2017/0101430 A1 Apr. 13, 2017

(30) Foreign Application Priority Data
Oct. 13, 2015 (FI) .......... 20155728

(51) Int. Cl.
*C07G 1/00* (2011.01)
*C08H 7/00* (2011.01)

(52) U.S. Cl.
CPC .......... *C07G 1/00* (2013.01); *C08H 6/00* (2013.01)

(58) Field of Classification Search
CPC .................. C07G 1/00; C08H 6/00
See application file for complete search history.

(56) References Cited

U.S. PATENT DOCUMENTS

| | | | |
|---|---|---|---|
| 4,918,167 A * | 4/1990 | Glasser | C08G 59/04 530/502 |
| 4,946,946 A | 8/1990 | Fields et al. | |
| 8,486,224 B2 | 7/2013 | Öhman et al. | |
| 8,613,781 B2 | 12/2013 | Cooper | |
| 2010/0325947 A1 | 12/2010 | Ohman et al. | |
| 2014/0186627 A1 | 7/2014 | Pu et al. | |
| 2014/0194603 A1* | 7/2014 | Lehmann | D01D 5/06 530/502 |
| 2016/0137680 A1* | 5/2016 | Thies | B01D 11/00 530/507 |

FOREIGN PATENT DOCUMENTS

| | | |
|---|---|---|
| FI | 20126030 | 10/2012 |
| WO | 2006031175 A1 | 3/2006 |
| WO | 2009021216 A2 | 2/2009 |

(Continued)

OTHER PUBLICATIONS

Safety Data Sheet for Eastman(TM) Dilute Acetic Acid, 56%, 12 pages, 2016.*

(Continued)

*Primary Examiner* — Nicholas E Hill
(74) *Attorney, Agent, or Firm* — Stiennon & Stiennon

(57) ABSTRACT

Lignin-rich starting material is suspended in a first medium, which is acidic and aqueous, to form a aqueous acidic suspension, which is heated and allowed to form two continuous phases, a thermoplastic lignin phase and an aqueous phase. The thermoplastic lignin phase is separated from the aqueous phase and passed through a shape giving process into a second medium which is at a temperature lower than that of the thermoplastic lignin phase and in which the thermoplastic lignin phase is essentially insoluble. Solid lignin formed in the second medium is recovered.

19 Claims, 3 Drawing Sheets

(56) References Cited

FOREIGN PATENT DOCUMENTS

| WO | 2013083876 A2 | 6/2013 |
|---|---|---|
| WO | 2014029918 A1 | 2/2014 |
| WO | 2014116150 A1 | 7/2014 |

OTHER PUBLICATIONS

Caicedo, Hector M., Luisa A. Dempere, and Wilfred Vermerris. "Template-mediated synthesis and bio-functionalization of flexible lignin-based nanotubes and nanowires." Nanotechnology 23.10 (2012): 105605.*
Search Report for FI20155728 dated May 16, 2016.
Finnish Patent and Registration Office, Office Action, dated May 16, 2016.
Orbis Research, "Lignin Products Global Market Size, Sales Data 2017-2022 & Applications in Animal Feed Industry," https://www.reuters.com/brandfeatures/venture-capital/article?id=4789, dated Apr. 20, 2017.
Tomani, Per, "The Lignoboost Process," Cellulose Chemistry and Technology, 44 (1-3), 53-58 (2010), dated Nov. 16, 2009.
Lamfeddal Kouisni, Peter Holt-Hindle, Kirsten Maki, Michael Paleologou, "The Lignoforce System™: A New Process or the Production of High-Quality Lignin from Black Liquor," Journal of Science & Technology for Forest Products and Processes: vol. 2, No. 4, 2012.
Michael A. Lake and John C. Blackburn, "SLRP™—An Innovative Lignin-Recovery Technology," Cellulose Chemistry and Technology, 48 (9-10), 799-804 (2014).

* cited by examiner

METHOD FOR PRODUCING SOLID LIGNIN

CROSS REFERENCES TO RELATED APPLICATIONS

This application claims priority on Finnish Application No. 20155728, Filed Oct. 13, 2015, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to a method for producing solid lignin from a starting material containing lignin.

Lignin has been recognized for a long time as an under-exploited renewable resource available for mankind. Today lignin rich streams available at pulp mills are used primarily in heat generation, i.e. they are combusted in recovery boilers. Separation of lignin from pulp mill spent liquor has not become popular mainly due to two reasons: lack of technically feasible solutions for executing the separation and lack of lignin-based value chains. Today, the global trend of developing bio-based applications has made lignin production attractive at a whole new level.

It is known to separate lignin from pulp mill black liquor using the following stages in sequence:

precipitation of lignin by a first stage of the pulp mill black liquor where the pH of the black liquor is lowered by adding a pH lowering agent, preferably CO2 followed by a first dewatering stage while forming a first filter cake, suspending the first filter cake in a second stage using a second acid or mixture of acids, wherein a lignin suspension is obtained, dewatering the lignin suspension by a second dewatering stage for forming a second filter cake, washing the second filter cake by adding a wash liquid to this washing stage, and dewatering the washed second filter cake obtaining a lignin product, said dewatering being typically made in the last stage of the wash apparatus.

Typically, the above described process is connected to the recovery operations receiving black liquor from a digester of the pulp mill.

These methods are known for example from international publication WO 2006/031175 (corresponds to European patent EP 1794363 and U.S. Pat. No. 8,486,224), and US Patent Application US 2010/0325947 A1. The lignin product obtained by these methods can be used as fuel or raw material for chemicals.

International publication WO 2009/021216 (corresponds to U.S. Pat. No. 8,613,781) presents a method where a moist lignin mass (up to 85% water, normally 45-55%) already separated from black liquor is heated to a "critical temperature" (76-93° C.), which induces a phase transition in the lignin. When the mass is subsequently cooled, the lignin will be separated on the bottom, leaving water as supernatant. According to another embodiment, shown by FIG. 3 of the document, dilute black liquor (not evaporated) is mixed with polymer coagulant agent and with heated diluted phosphoric acid so that the temperature of the mixture remains above 82° C. and the pH is below 3.5, whereafter the mixture is fed to a lignin separation tank, where the lignin is separated upon cooling.

International publication WO2014/116150 presents a method where lignin is first precipitated from black liquor with carbon dioxide, and to the obtained lignin cake, sulphuric acid is added to form an acidic slurry with a pH value in the range 1-3. The acidic slurry is heated to the temperature in the range 100-120° C. and kept in the temperature range a sufficient time so that at least 60% of carbohydrates (hemicelluloses) in the lignin are hydrolyzed, whereafter the slurry is cooled and purified lignin with low carbohydrate content is separated from the cooled slurry by filtration.

The process according to WO2014/116150 produces purified lignin, which after further processing can be used in higher value applications instead of using the lignin only as fuel because of its purity, especially low carbohydrate content. There exists, however, a need to control the physical solid state of the lignin so that the lignin obtained is more easily processable and possibly already in the form which is closer to its form in the final application.

SUMMARY OF THE INVENTION

It is an aim of the present invention to present a novel process using the lignin obtained from plant material for converting it to more refined form.

The aim of the invention is to provide a method for processing lignin separated from a lignin containing liquid medium, especially spent liquors resulting from biomass fractionation, such as spent liquor from alkaline cooking process of pulp, so that the lignin is in a more refined form after the method.

It is especially an aim of the present invention to provide a method which increases the value and possibilities of the lignin for various uses in structural applications.

In order to achieve the aims presented above, the invention is characterized by suspending the starting material in a first medium, which is acidic and aqueous, to form a aqueous acidic suspension;

heating the aqueous acidic suspension and allowing the suspension to form two continuous phases, a thermoplastic lignin phase and an aqueous phase;

separating the thermoplastic lignin phase from the aqueous phase;

passing the separated thermoplastic lignin phase into a shape giving process by introducing it to a second medium which is at a temperature lower than that of the thermoplastic lignin phase and in which the thermoplastic lignin phase is essentially insoluble; and recovering the solid lignin formed in the second medium.

Thus in the method, lignin-rich starting material in solid form, which is originally separated from a spent liquor of a biomass fractionation process, is suspended in an acidic aqueous solution whose acidity is set high enough to keep the resulting acidic aqueous suspension at pH of 1-5. The temperature of the suspension is set high enough to induce the formation of two continuous and separate phases: a thermoplastic (soft, viscous) lignin phase as a result of softened and agglomerated lignin particles, and an aqueous phase, where some lignin particles may remain suspended. The phases can be separated by gravitation or centrifugation because of their density differences. The separated thermoplastic lignin phase is then introduced to a second medium which is at a lower temperature than the continuous thermoplastic lignin phase. The thermoplastic properties of the continuous lignin phase can be used to give the lignin a desired solid shape by means of a shape-giving structure, such as a nozzle or a plurality of nozzles, through which it is fed to the second medium, and the lignin solidifies in the given shape when it is brought in contact with a cooler second medium. The lignin can be in the form of particles with desired size distribution The method involves the change of the physical state of the lignin, starting from solid lignin particles of any kind in the starting material, passing through the agglomeration (coalescing) of the particles to the physical state of thermoplastic continuous phase, and ending in the physical conversion of the thermoplastic phase to a solid lignin product with targeted shape of the lignin. Due to the shaping possibilities, the product can be for example in granulated form or any other form which is easy to handle, contrary to a dry lignin powder which is susceptible to dusting.

Because the lignin-rich starting material is suspended in an acidic aqueous medium at an elevated temperature, the impurities, such as metals and carbohydrates (hemicellulose residues from the original plant biomass) in the lignin, are effectively removed from the lignin and removed with the acidic aqueous phase.

Some preferred embodiments of the invention, related to the shape giving processes and possible preprocessing steps are described more closely in the following description.

BRIEF DESCRIPTION OF THE DRAWINGS

The invention will be described in more detail with reference to the appended drawings, in which.

DESCRIPTION OF THE PREFERRED EMBODIMENTS

Origin of Lignin

Figure 1:
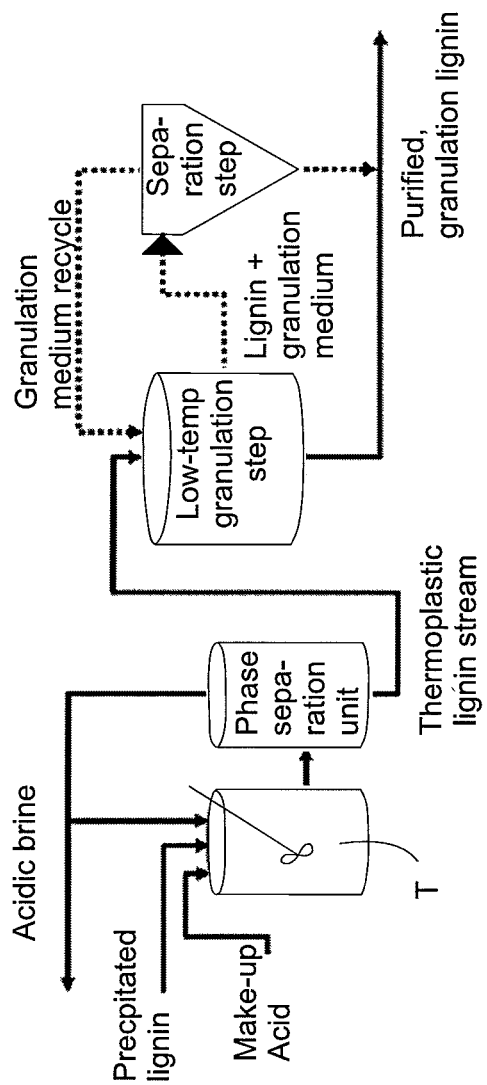
FIG. 1 shows a process flow chart of the method according to one embodiment of the invention.

The lignin rich starting material used in the method is obtained from a biomass fractionation process, where lignin is a constituent of plant biomass from which it becomes separated in the course of the process. The biomass may contain residual lignin after the process. A typical fractionation process is a process called delignification, where lignin is separated from cellulose by cooking the biomass with the help of chemicals and it is carried over to spent liquor of the cooking chemicals, and it can be sulphite, soda (including soda-anthraquinone), or kraft (sulphate) delignification process. Thus, the spent liquor can be for example black liquor from kraft (sulphate) cooking.

The lignin can come from other biomass fractionation processes as well, where it is separated in course of the fractionation. One possible source is the biomass fractionation process where bioethanol is made from lignocellulosic biomass through hydrolysis of cellulose to sugars and subsequent fermentation and distillation. The hydrolysis of cellulose can be acidic or enzymatic. This biomass fractionation process leaves a lignin-rich residue which can be used as the lignin-rich starting material for the present method. Thus, all fractionation processes of lignocellulosic biomass where a lignin-rich fraction is produced can serve as the source of lignin-rich starting material for the present method.

It is intended throughout the present description that the expression "lignin containing liquid medium" is any liquid, which contains lignin in dissolved or dispersed form, especially any spent liquor from a biomass fractionating process, especially biomass fractionation in a chemical pulp mill. The origin of the lignin is wood or other plant biomass such as straw that has been digested in the pulp mill in a process called cooking to prepare chemical pulp. The composition of the spent cooking liquor depends on the cooking method. The spent liquor from kraft (sulphate) cooking which is obtained after the separation of the pulp is called black liquor and it contains dissolved and dispersed organic wood material and residual alkali compounds. In the following description, mainly black liquor is referred to as the lignin containing liquid medium from which the lignin used as the starting material can be separated. All lignin containing spent liquors from alkaline cooking processes (which include soda cooking and soda-anthraquinone cooking) can be used.

The composition of the lignin containing liquid medium and the form of lignin therein is dependent on the preceding process and its conditions where lignin has entered this liquid medium. The liquid medium is preferably an aqueous medium, where lignin can exist as solution, colloidal dispersion or slurry. For example it is known that the lignin is either dissolved or dispersed in black liquor in the colloidal form, depending on the pH of the black liquor and lignin molecular weight. The colloidal dispersion is stabilized by charged phenolic and carboxylic acid groups on the lignin (Marton, J., On the structure of kraft lignin, Tappi, 47(11), 713-719 (1964)). In the precipitation of the lignin from the liquid medium, lignin of such an increased particle size is created which can be separated from the liquid medium by physical methods, especially by filtration.

Production of Solid Lignin Through Treatment of Lignin-Rich Starting Material

FIG. 1 shows, the general principle of the method as a flowchart.

The process described purifies and agglomerates lignin precipitated from alkaline spent pulping liquor (black liquor). The black liquor feedstock may originate from chemical pulping of wood, annual, biennial, or perennial plants using hydroxide, carbonate, or sulfide salts or a combination of these as the active pulping chemical.

Lignin (lignin salt) is separated from black liquor using known methods. Preferably, lignin is precipitated by reducing the black liquor pH to 8-10 by adding a pH lowering agent, and the precipitate formed is separated from black liquor by filtration. The lignin separated contains a substantial amount of impurities both as black liquor carry over and as carbohydrate components covalently attached in lignin macromolecules.

The lignin feedstock, precipitated alkaline lignin (arrow "Precipitated lignin" in FIG. 1) is suspended in a first medium, an acidic aqueous solution, in a mixing tank T. The acidity of the solution is set high enough to keep the resulting suspension at pH 0-5, preferably 0-4, most preferably 2-4. The acid used may be organic or inorganic. Suitable inorganic acids are for example sulfuric acid, hydrochloric acid, nitric acid, and phosphoric acid. The consistency of the lignin suspension is preferably 10-25 wt-%, calculated as percentage ratio of oven dry lignin/ (oven dry lignin+liquid medium).

The suspension in the mixing tank T is heated to 120-180° C., preferably 120-160° C. or 140-180° C. The suspension may be agitated or not. The conditions applied soften the lignin particles and lead to their agglomeration. The coalescence of lignin particles leads to a state where the original suspension (solid particles in a continuous liquid phase) is mostly converted into a system of two continuous phases: an aqueous liquid phase and a thermoplastic (soft, viscous) lignin phase. Some lignin may remain suspended in the aqueous phase. The upper and lower limits of the temperature range and the optimum temperature to which the lignin suspension is heated depends for example on the type or origin of the lignin and the viscosity. When the temperature is too low, there is no change in the physical state of the lignin, and when the temperature is too high, there will be changes in the chemical properties of the lignin, the lignin becomes too sticky, and tends to adhere to the equipment used.

The term "suspending" and "suspension" does not exclude the physical form where part of the lignin may also be in a dissolved form.

The formation of the two continuous and separate phases takes place in a phase separation unit, to which the heated and acidified aqueous lignin suspension is introduced from the mixing tank.

The phase separation unit may be provided with heating to keep the temperature of the system at a suitable value. When the system is allowed to settle in the phase separation unit, the two phases form independent continuous layers due to their different densities. The continuous thermoplastic lignin phase, which is heavier, will be settled on the bottom part of the phase separation unit, and the aqueous acidic phase will remain on the top. Phase separation may be allowed to occur by gravitation or it may be accelerated using centrifugal processes. The settling time used may be for example 30 min. The two phases formed can be separated via decanting or similar methods.

From the phase separation unit, the thermoplasticized lignin is introduced to a second medium, where it is brought back to particle form or to other solid shapes by cooling, which takes place by the effect of the temperature of the second medium which is lower than that of the thermoplastic lignin phase. In FIG. 1, the thermoplasticized lignin is taken from the bottom of the phase separation unit as a thermoplastic lignin stream, which is passed to a low-temperature bath of the second medium in which the lignin is immiscible (indicated "Low-temp granulation step"). The second medium is water at a temperature below 100° C. Solid lignin particles or "granules" are formed in the cool medium by passing lignin through a shape giving process in form of a nozzle or several nozzles into the cool medium. Lignin is transformed into a droplet form by the nozzle. A decreased temperature makes the droplets harden, thus preventing re-coalescence. Instead of water, air can also be used as the cool medium, and also other liquids and gases may be used, provided that they are at a temperature which solifidies the thermoplastic lignin after entry of the lignin in the second medium.

The size properties of the resulting granules, e.g. average size and size distribution, are controlled e.g. with the nozzle arrangement. However, the shape giving process through which the thermoplastic lignin phase passes before entering the cool second medium can be used for giving any other shape to the objects of lignin when the lignin solidifies in the medium, and this can be achieved both with liquid and gaseous media as second media. It is for example possible to make elongated objects, such as fiber-like or filament-like objects by selection of nozzle diameter and flow rate of the thermoplastic lignin stream to the second medium. By choice of nozzle shape, other shapes are also obtainable, like tubular objects or profiles. Extrusion or injection molding can also be used for introducing the lignin into the second medium. Thus, the introduction of the thermoplastic lignin to the second medium through a shape-giving structure that determines the shape of the lignin can be called a shape-giving process.

Next the solid lignin product is separated from the second medium in a separation step. Because the size and shape of the objects formed of solidified lignin can be controlled in the shape-giving process, the separation can take place without filtration of the lignin from liquid medium. For example the lignin granules formed are large enough to facilitate easy de-watering (separation from the surrounding aqueous phase) and handling in further processing, if the second medium is water. Sedimentation, settling, draining, centrifugation and cyclone separation are suitable solid-liquid separation methods for the objects of solidified lignin. If the second medium is air, the objects of solidified lignin can be separated by cyclone from the stream of air or settled and gathered from the stream of air by any suitable arrangement.

Furthermore, the lignin product formed is of high purity: hemicellulose impurities covalently bonded or adsorbed on lignin are effectively degraded under the hot acidic conditions applied when the starting material is suspended in the first medium, and practically all water soluble impurities, including the hemicellulose degradation products, exit the process in the aqueous side stream separated in the phase separation unit. If the second medium is water, water soluble impurities such as metal salts, which were formed by the effect of the acid used in the first medium (such as Na2SO4 if sulphuric acid was used) can still be washed from the solidified lignin to the surrounding aqueous phase. If the second medium is air, the objects of solidified lignin can be subjected to a washing step.

According to FIG. 1, various process streams can be recycled. The aqueous' acidic phase (Acidic brine) from the phase separation unit can be recycled, to the mixing tank to make the acidic aqueous solution and/or to be used in pretreatment steps of the lignin feedstock. Fresh acid (Make-up acid) is added to the mixing tank to keep the pH at sufficient low level. After separating the lignin, the second medium from the separation step can be recycled back to the bath of second medium.

Figure 2:
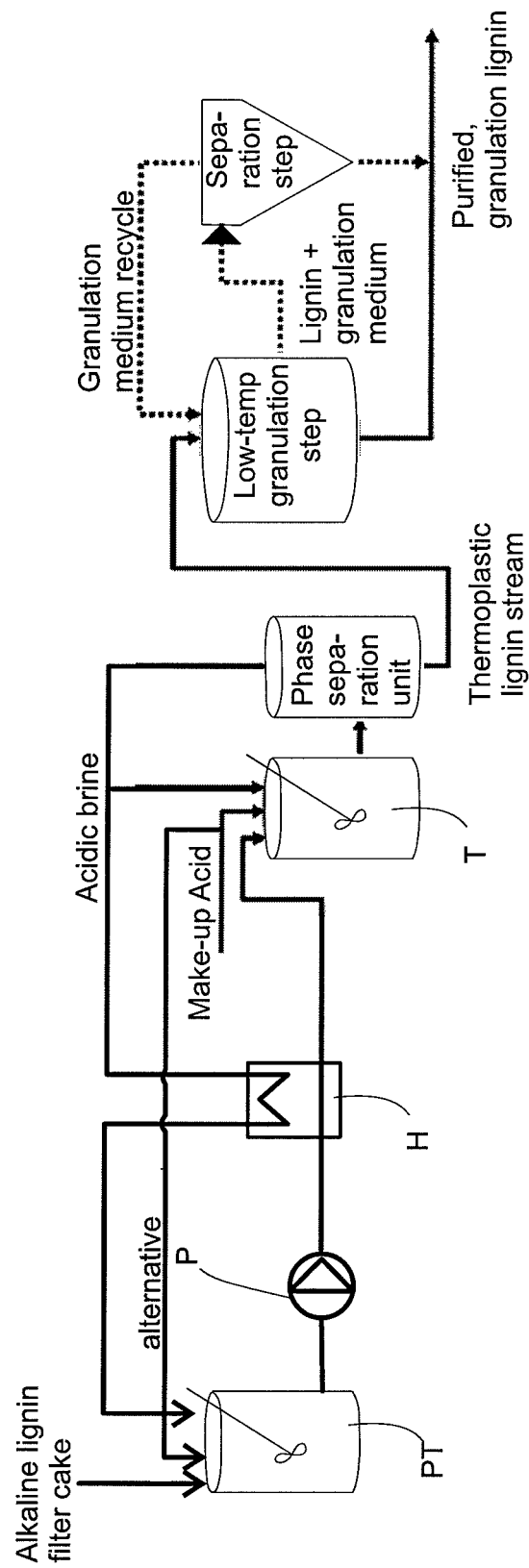
FIG. 2 shows a process flow chart of the method according to another embodiment of the invention.

FIG. 2 shows an embodiment of the method which comprises a preliminary slurrying step for the lignin feedstock before it is brought in contact with the first medium. The alkaline lignin filter cake obtained from the separation of lignin from the alkaline spent pulping liquor is slurried in a medium, which is acidic and aqueous, but has a lower temperature than that of the first medium (acidic preliminary slurrying). The operation is performed in a preliminary mixing tank PT. The temperature of the medium where the alkaline lignin is slurried is below 100° C. The aqueous acidic phase from the phase separation unit can be recycled to this preliminary slurrying step to form the preliminary slurrying medium. In this preliminary slurrying step, some purification of the lignin may already take place. The heat of the recycled aqueous acidic phase (Acidic brine) can be utilized in preheating the lignin feedstock before the lignin is introduced to the mixing tank (shown by heat exchanger). Alternatively, make-up acid added to the mixing tank can be used also for the preparation of the preliminary slurrying medium. The pH of the slurry can be adjusted to be the same as the pH of suspension in the first medium already at this stage, if fresh acid is added to this stage (arrow "alternative"). If the slurry is made by only recycling the aqueous acidic phase from the first medium, the pH will higher due to the alkalinity of the filter cake.

Figure 3:
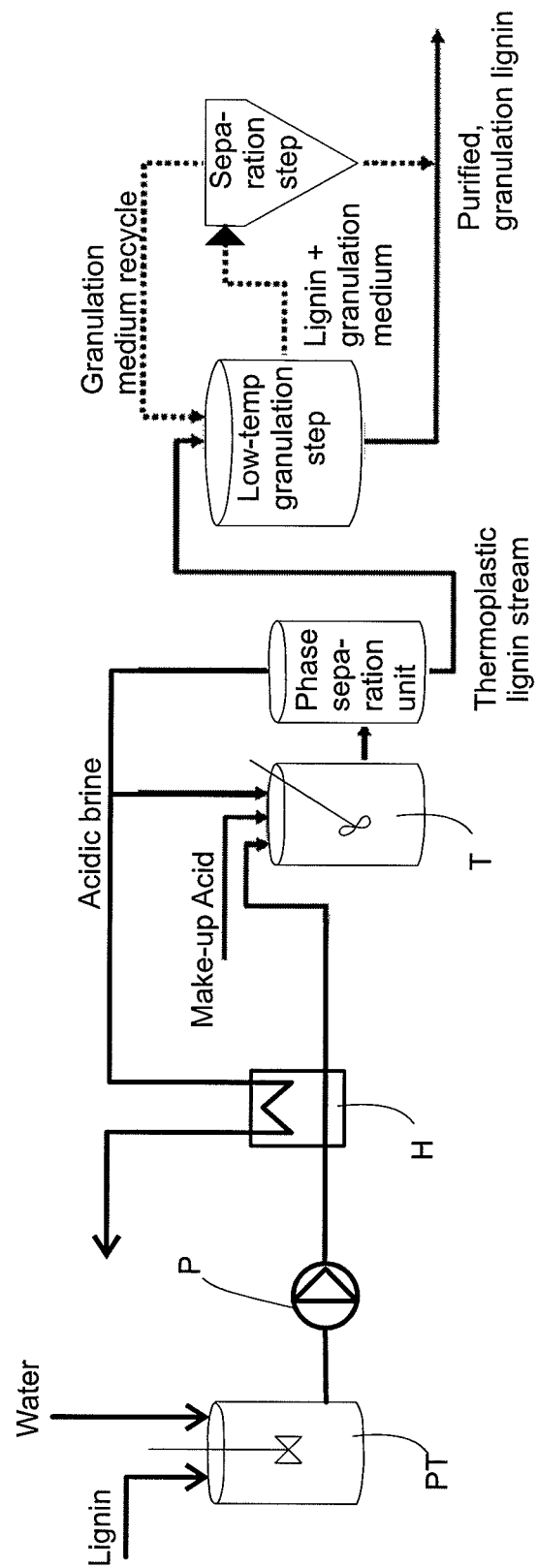
FIG. 3 shows a process flow chart of the method according to a third embodiment of the invention.

FIG. 3 shows another embodiment of the method which comprises a preliminary slurrying step for the lignin feedstock before it is brought in contact with the first medium. The alkaline lignin filter cake obtained from the separation of lignin from the alkaline spent pulping liquor is preliminarily slurried in a preliminary mixing tank PT. The slurry is alkaline and aqueous due to the alkalinity of the cake (alkaline preliminary slurrying), but has a lower temperature than that of the first medium. Water can be added if needed to make a pumpable slurry. The temperature of the alkaline lignin slurry is below 100° C., preferably not higher than 80° C. The alkaline preliminary slurrying has less emissions of H2S from the lignin compared with the acidic preliminary slurrying in case the lignin is from kraft (sulphate) cooking.

The embodiments of FIG. 2 and FIG. 3 help to make a pumpable slurry which can be fed from the preliminary mixing tank PT to the mixing tank T where the suspension is at the higher temperature. It is also easier to add lignin-rich starting material to an atmospheric tank at a temperature below 100° C. to make a suspension than to the mixing tank, which is a pressurized reaction tank because the temperature inside the tank is well above 100° C. In FIGS. 2 and 3, the pump in the conduit between the preliminary mixing tank PT and the mixing tank is designated P, and the heat exchanger for preheating the pumped lignin slurry in the conduit with the hot acidic aqueous phase from the phase separation unit is designated H.

The method also offers a possibility to include additional materials to the solid lignin product during various steps of the method, especially to the thermoplastic continuous phase of the lignin. The additional material mixed to the separated thermoplastic lignin phase can be a polymer or mixture of polymers other than lignin, which include synthetic polymers and cellulose, to modify the material properties of the product. Substances adding some functional properties to the lignin, such as coupling agents and activators, can also be added. However, the amount of additional materials should be below 50 wt-% of the total dry weight of the solid lignin product.

The method also offers a possibility to subject the thermoplastic lignin, before introducing it to the shape giving process and second medium, to intermediate processing which is purification. Water and/or metals that may exist in the lignin can be further removed in this step from the thermoplastic phase of lignin.

The method according to the invention can be integrated in a chemical pulp mill where alkaline cooking process is used for the delignification of pulp. Alkaline lignin used as the lignin-rich starting material of the method can be precipitated from the alkaline spent liquors of the cooking process. For example black liquor can be taken at any point between the digester and the recovery boiler, preferably from the evaporation stage where it has not yet reached the final dry solids content where it is burnt in the boiler. The separation of lignin takes place by adding pH lowering agent, for example CO2, to the black liquor, and the lignin precipitated at the lowered pH is separated from the obtained slurry for example in a filter press. The lignin cake so obtained can be used as the lignin-rich starting material of the method.

The method can also be integrated in a bioethanol-production plant which uses lignocellulosic raw material and produces a lignin-rich residue as a side product.

However, the method can be also performed in a separate manufacturing plant to which the lignin-rich starting material (such as alkaline lignin separated from alkaline spent liquor by precipitation or lignin-rich residue of bioethanol production, as explained above) is transported.

The applicability of the process stages described above in connection with embodiments of FIGS. 1, 2 and 3 is not dependent on the source of the lignin-rich starting material and the separation of this raw material in the process where this raw material is obtained. The lignin-rich starting material may be separated from a spent liquor of a biomass fractionation process, such as from alkaline spent pulping liquor, it may be in the form of lignin-rich residue from bioethanol production, or it may be originally from any biomass fractionation process that produces lignin-rich starting material that can be suspended in the first acidic aqueous medium or re-slurried in the mixing tank (FIGS. 2 and 3). It is also possible that some mechanical processing such as milling is needed before the lignin-rich starting material can be supplied to the process.

Many variations of the present invention will suggest themselves to those skilled in the art in light of the above detailed description. Such obvious variations are within the full intended scope of the appended claims.

We claim:

1. A method for producing solid lignin from lignin-rich starting material, characterized by
    suspending the starting material in a first medium, which is an aqueous solution of an inorganic acid having a pH in the range of from 0 to 5, to form an aqueous acidic suspension having a dry solid content of 10-25 weight percent;
    heating the aqueous acidic suspension to a temperature in the range of 120 to 180° C. and allowing the suspension to form two continuous phases, a phase comprising thermoplastic lignin and an aqueous phase;
    separating the phase comprising thermoplastic lignin from the aqueous phase;
    passing the separated phase comprising thermoplastic lignin through a shape giving process into a second medium, which is at a temperature lower than that of the thermoplastic lignin phase and in which the phase comprising thermoplastic lignin is essentially insoluble, whereby the lignin solidifies in a form of granules when it is brought in contact with the cooler second medium; and
    recovering the solid lignin formed in the second medium; wherein the separated phase comprising thermoplastic lignin is introduced to the second medium through one or several nozzles and the second medium is water.

2. The method according to claim 1, wherein the first medium is an aqueous solution of sulfuric acid, hydrochloric acid, nitric acid or phosphoric acid.

3. The method according to claim 2, wherein the first medium is an aqueous solution of sulfuric acid.

4. The method according to claim 1, wherein the pH of the first medium is in the range of 0 to 4.

5. The method according to claim 1, wherein the suspension is heated to a temperature in the range of 140 to 180° C.

6. The method according to claim 1, wherein the phase comprising thermoplastic lignin is separated from the aqueous phase by gravity.

7. The method according to claim 1, comprising:
    subjecting the separated phase comprising thermoplastic lignin to intermediate processing before introducing it to a second medium.

8. The method according to claim 7, wherein the intermediate processing is a purification process.

9. The method according to claim 7, wherein the intermediate processing is a mixing process where additional material is mixed with the separated phase comprising thermoplastic lignin.

10. The method according to claim 9, wherein the additional material mixed with the separated phase comprising thermoplastic lignin is a polymer or mixture of polymers other than lignin.

11. The method according to claim 1, comprising prior to suspending the lignin-rich starting material in the first medium, slurrying the starting material in an acidic aqueous medium at a temperature lower than that of the first medium.

12. The method according to claim 1, comprising prior to suspending the lignin-rich starting material in the first medium, slurrying the starting material in an alkaline aqueous medium at temperature lower than that of the first medium.

13. The method according to claim 1, comprising:
adding a pH lowering agent to a lignin containing liquid medium for precipitating lignin;
separating the precipitated lignin from the remaining liquid phase of the lignin containing liquid medium; and
using the separated precipitated lignin as the starting material, which is suspended in the first medium.

14. The method according to claim 13, wherein the lignin containing liquid medium is alkaline spent pulping liquor.

15. The method according to claim 14, wherein the lignin containing liquid medium is black liquor.

16. The method of claim 14, wherein the first medium is an aqueous solution of sulfuric acid.

17. The method of claim 1 further comprising:
suspending the starting material in the first medium in a mixing tank,
separating the phase comprising thermoplastic lignin from the aqueous phase in a phase separation unit, and
recycling acidic aqueous phase from the phase separation unit to at least one of:
the mixing tank, and
to be used in pretreatment steps of lignin feedstock.

18. The method of claim 17, comprising:
utilizing heat of the recycled aqueous acidic phase in preheating the lignin-rich starting material.

19. A method for producing solid lignin granules from lignin-rich starting material, characterized by
suspending alkaline spent pulping liquor or black liquor in a first medium, which is an aqueous solution of an inorganic acid having a pH in the range of from 0 to 5, to form an aqueous acidic suspension having a dry solid content of 10-25 weight percent;
heating the aqueous acidic suspension to a temperature in the range of 120 to 180° C. and allowing the suspension to form two continuous phases, a phase comprising thermoplastic lignin and an aqueous phase;
separating the phase comprising thermoplastic lignin from the aqueous phase by an acceleration selected from gravity and centripetal; and
passing the separated thermoplastic lignin phase through at least one nozzle into water having a temperature lower than that of the phase comprising thermoplastic lignin and in which the phase comprising thermoplastic lignin is essentially insoluble, such that the phase comprising thermoplastic lignin forms droplets which solidify in the shape of granules with a selected size distribution controlled by the at least one nozzle.

* * * * *